United States Patent [19]

Hoyerman

[11] 4,316,696

[45] Feb. 23, 1982

[54] MECHANISM FOR TRANSFERRING CERTIFIED WEIGHTS FROM AND INTO A VEHICLE

[76] Inventor: William H. Hoyerman, c/o General Body Co., 5838 N. Pulaski Rd., Chicago, Ill. 60646

[21] Appl. No.: 128,186

[22] Filed: Mar. 7, 1980

[51] Int. Cl.³ .......................... B60P 1/54; B66C 1/38
[52] U.S. Cl. .................... 414/542; 212/142.1; 294/81 R; 294/83 R
[58] Field of Search ................ 414/540, 541, 542; 212/76, 77, 87, 88, 95, 94, 142.1; 294/81 R, 83 R; 73/1 R, 1 B

[56] References Cited

U.S. PATENT DOCUMENTS

| | | | |
|---|---|---|---|
| 1,124,217 | 1/1915 | Emery | 414/542 |
| 3,482,715 | 12/1969 | Worthington | 414/542 |
| 4,048,843 | 9/1977 | Dunbar | 73/1 B |
| 4,128,267 | 12/1978 | Niblett et al. | 294/83 R |
| 4,194,867 | 3/1980 | Bragg | 414/542 |

OTHER PUBLICATIONS

Brochure—*Drop Floor Low Profile* General Body Company.

Primary Examiner—Robert G. Sheridan
Attorney, Agent, or Firm—Wegner, Stellman, McCord, Wood & Dalton

[57] ABSTRACT

A scale testing vehicle for transporting certified weights and depositing them on the platform of truck scales, the vehicle body having a pair of rails supported above a truck bed carrying the weights and having a trolley carried by the rails for movement fore and aft. A cable is looped over pulleys at each end of the rail and is attached at one end to the trolley with its free end passing over a sheave on the trolley and supporting a bar having hooks for attaching to the weights. One of the pulleys may be moved to change the cable loop length, thereby raising or lowering the weights supported on the hooks. The bar has a counterweight which pivots the hooks when the weights are not supported therefrom so that the hooks clear the weights when moved horizontally. Hydraulic output from a truck engine driven pump is used to traverse the trolley as well as to raise and lower the weights so that transfer between truck and scale may be expeditiously accomplished.

8 Claims, 5 Drawing Figures

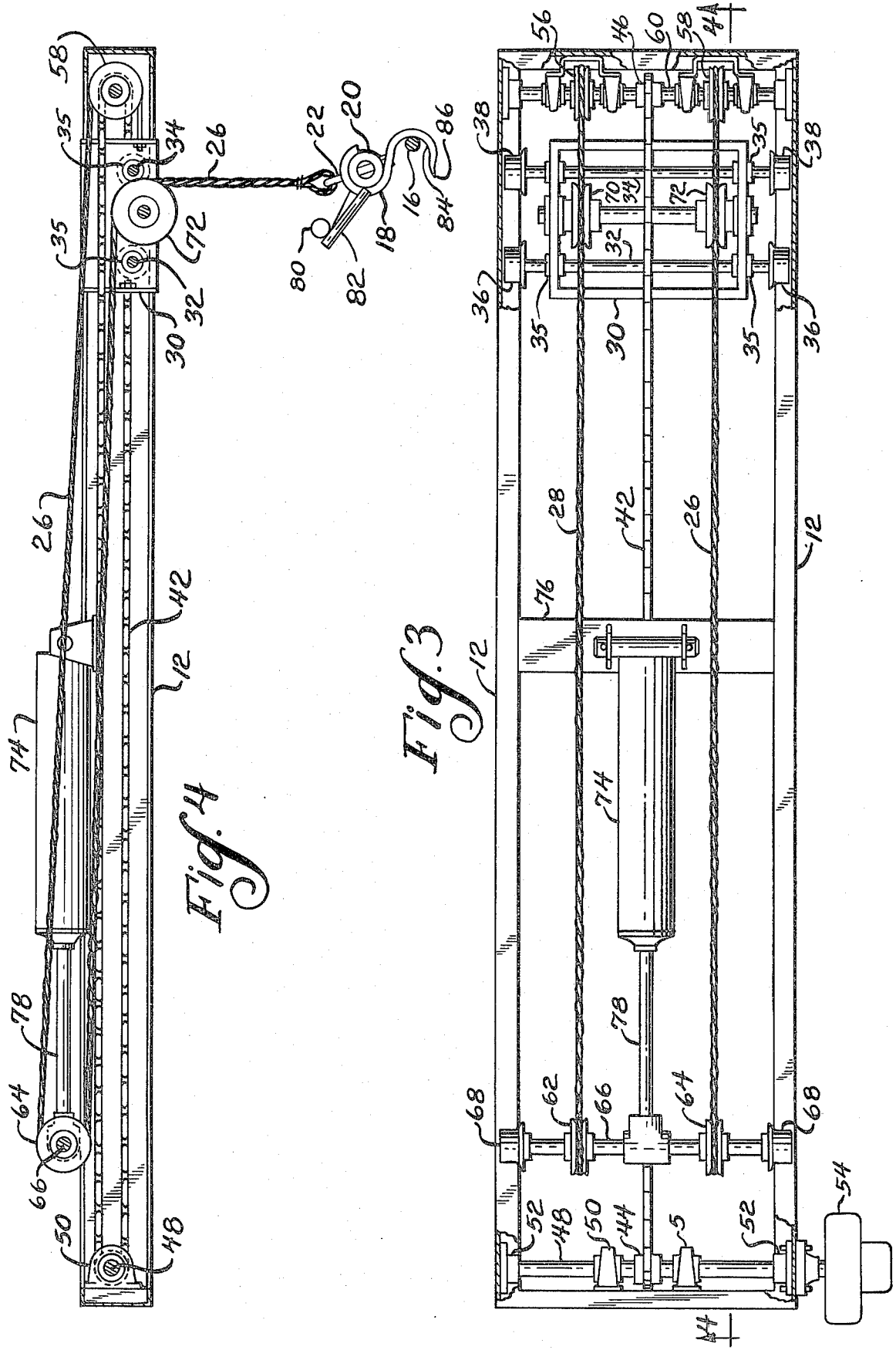

MECHANISM FOR TRANSFERRING CERTIFIED WEIGHTS FROM AND INTO A VEHICLE

BACKGROUND OF THE INVENTION

Truck weighing stations need to be tested periodically to ensure their accuracy. Such stations include those along highways maintained by state highway departments to determine compliance with vehicular weight restrictions and those weigh stations at industrial plants which are used to determine the weight of truck deliveries. Most states require that the scales alongside highways be calibrated at periodic intervals. The testing of these scales consists of placing known weights weighing several thousand pounds at specified locations on the scale platform and calibrating the scale by comparing the actual weight to the indicated weight. Adjustments in read-out then can be made to accurately reflect the known weight. Ten to twenty thousand pounds is a commonly used known weight for each scale testing.

Most states have employed a traveling staff who carry along weights to the various scales and then place those weights upon the platform to calibrate the scales. To facilitate this testing, there is a need for trucks which carry the standard weights between stations and quickly lift them on and off the scale for testing.

Trucks currently used have been relatively slow in depositing and picking up the weights from the scale. These have generally used an electric hoist which raises and lowers weights suspended from a cable and have used electric motor driven means to move the hoist into or out of the truck bed for moving the weights. In addition, the weight have been supported in a manner which requires the operator to move from the controls to manually attach or disengage the weights from the cable. All of these features have caused prior mechanisms to be relatively slow in loading and unloading the weights.

The present invention is directed to overcoming one or more of the problems as set forth above.

SUMMARY OF THE INVENTION

In one aspect of this invention, there is provided a pair of rails suspended fore and aft over a truck bed carrying the weights, the rails supporting a trolley for movement therealong. A cable is looped around pulleys at both ends of the rails and is secured at one end to the trolley with a free end passing downwardly over a sheave in the trolley. The free end supports a bar with hooks which may be attached to support bars on calibrated weights, and such free end may be raised or lowered by moving one pulley at the end of the rails to change the cable loop length. This configuration adds speed to the loading and unloading operations since the cable end is moved twice as far as the movement of the pulley, raising and lowering the weights faster than the hoists currently used. Also, movement of the trolley does not change the height of the free end of the cable.

The bar supporting the hooks has a counterweight which pivots it when no weight is suspended therefrom. When so pivoted, the hooks clear the support bars on the weights when the hooks are moved horizontally. The operator does not have to manually disconnect the hooks from the bar. Therefore, since the weights may be picked up and deposited solely by moving the trolley fore and aft and raising and lowering the cable end, a single operator can remain at one position by the controls. This further increases the speed which the weights may be moved. The act of depositing the weights either in the truck bed or upon a scale platform leaves the weights in position to be reattached to the lifting and transporting mechanism, thus contributing to faster movement of the calibrated weights between useful and transport positions.

BRIEF DESCRIPTION OF THE DRAWINGS

FIG. 3 is a partially broken plan view of the trolley and rail mechanism of this invention;

FIG. 4 is a cross-sectional side elevational view of the mechanism shown in FIG. 3 taken as indicated along line 4—4 in FIG. 3;

DESCRIPTION OF THE PREFERRED EMBODIMENT

Figure 1:
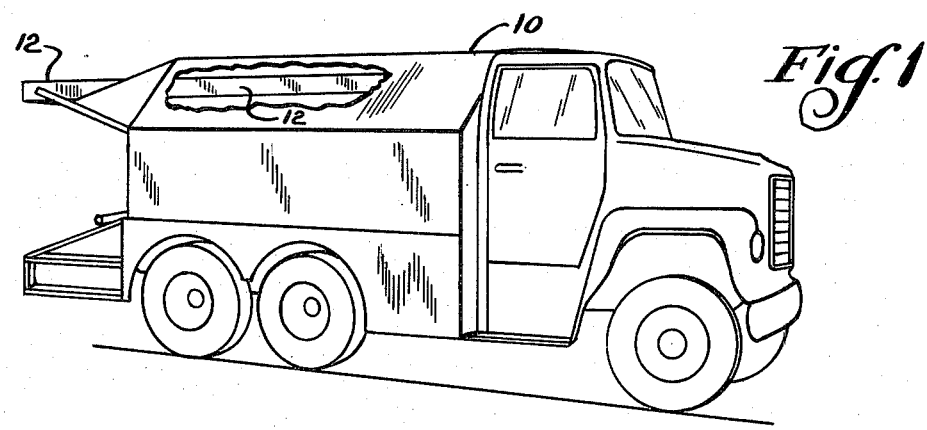
FIG. 1 is a partially broken view of a vehicle containing this invention.

An on-highway transport truck 10 for carrying certified weight blocks for use in testing vehicle scales is shown in FIG. 1. Twenty weights, each being on the order of 1000 pounds are typically carried on the bed of the truck 10, which weights are placed at various locations on the platform of a scale to test its accuracy. The truck body is constructed to support a pair of generally horizontal rails 12 extending for and aft over the truck bed floor, which are used in loading and unloading the weights from the truck 10 for performing tests.

Figure 2:
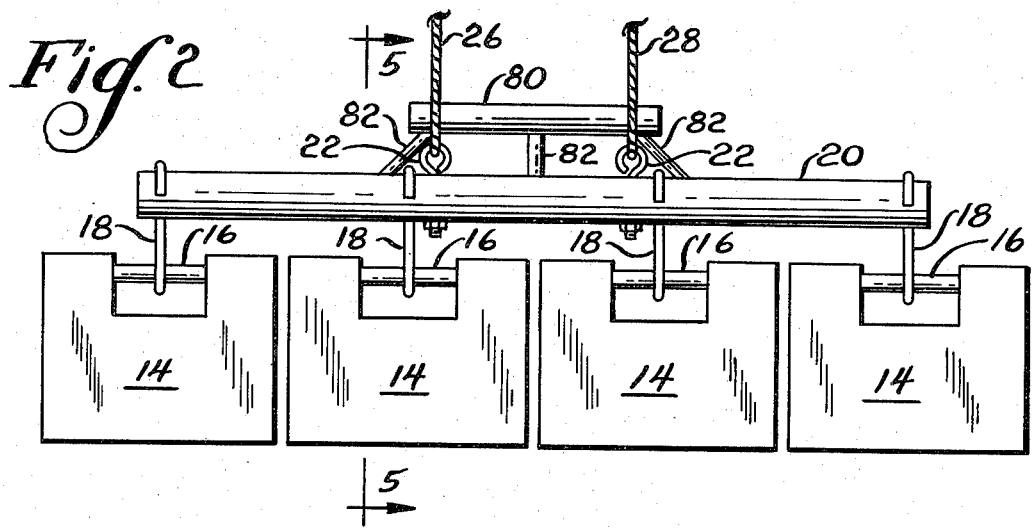
FIG. 2 is an upright view of the spreader bar in position to lift and supporting four calibrated weights.

Four weights 14 are carried into or out of the truck 10 together, each weight 14 having a support bar or bail 16 for receiving a hook 18. As shown in FIG. 2, a spreader bar 20 carries the hooks 18 at appropriately equally spaced intervals. The spreader bar 20 has eyebolts 22,24 through which are connected two cables 26,28 from which in turn, the weights 14 on the spreader bar 20 may be suspended. The spreader bar will extend horizontally but be fairly easily pivoted about the eyebolt connections to the cables. Other details of the spreader bar 20 are specified hereinafter.

The mechanism carrying the spreader bar 20 and weights 14 is shown in detail in FIGS. 3 and 4. The rails 12, suspended over the truck bed and extending out beyond the truck bed in the rear, guide a trolley 30 in reciprocal movement thereon. The trolley 30 has two axles 32,34 fixed in bearings 35, each axle 32,34 having a pair of wheels 36,38 which roll on the rails 12. A chain 42 looped over sprocket wheels 44,46 at each end of the rails 12 and having each end connected to the trolley 30 reciprocates the trolley 30 on the rails 12. The sprocket wheel 44 nearest the truck cab is secured to an axle 48 which pivots in bearings 50,52 secured to the end and sides of the rails 12. This axle 48 is driven by a hydraulic motor 54 which is operably supplied with pressurized oil from a pump (not shown) driven by a truck engine. Movement of the chain 42 can move the trolley 30 at a rate of about 3 to 5 feet per second, the rate being adjustable by the operator by adjustment of a fluid control valve (not shown) on the hydraulic motor 54.

The cables 26,28 which support the spreader bar 20 are connected at one end to the trolley 30 and form a loop by passing over two pairs of pulleys, one pair 56,58 secured on the rod 60 which supports the sprocket wheel 46 at the projecting end of the rails 12 and the other pair 62,64 on an axle 66 supported by wheels 68 for movement along the top of the rails 12. The free ends of the cables 26,28 pass over sheaves 70, 72 on the trolley 30 downwardly therefrom to the eyebolts 22,24.

To raise or lower the cable ends, a remotely controlled hydraulic cylinder 74 pivotally mounted on a base 76 secured to the rails 12 reciprocates a piston rod 78 which moves the axle 66 and thus the cable pulleys 62,64 longitudinally of the rails 12. The operator may control the speed of this motion by adjustment of a fluid control valve (not shown) in the hydraulic line leading to the hydraulic cylinder 74. The cable pulleys 62,64, when moved, change the length of the cable loop and thereby change the length of the cables 26,28 which hang freely from the trolley 30. This configuration provides several advantageous features. For every unit that the piston rod 78 changes the cable loop length, the freely hanging ends of the cables 26,28 move up or down two units. This results in increased speed in raising or lowering the weights 14. In addition, because the loop is tied to the trolley 30, the loop length does not change when the trolley 30 moves and thus, the spreader bar 20 hanging from the free ends of the cables 26,28 remains at the desired height during in and out movement of the trolley relative to the truck bed.

Figure 5:
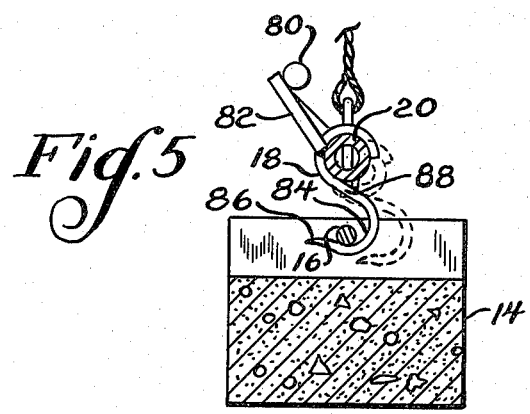
FIG. 5 is a partial, broken cross-sectional side view of the spreader bar and weight taken as indicated along line 5—5 in FIG. 2.

Referring to FIGS. 2, 4 and 5, the spreader bar 20 is provided with a counterweight 80 on upwardly extending supports 82 welded or otherwise secured to the spreader bar 20. The S-shaped hooks 18, which are also welded to the spreader bar 20, have open ended bights 84 which permit the hooks 18 to accept the support bars 16 of the weights 14. The arc of the bight 84 is less than 180°, causing the free end 86 and midsection 88 of each hook to have an acute angle therebetween.

As shown in FIG. 4 and in phantom in FIG. 5, when no weights 14 are suspended from the hooks 18, the counterweight 80 causes the spreader bar 20 to pivot so that the free ends 86 of the hooks 18 are generally horizontally oriented. Because of the angle between the free end 86 and the midsection 88, the midsection is thus downwardly oriented toward the bight 84. When so oriented, the support bars 16 of the weights 14 may be easily moved into or out of the bight 84 of the hooks by merely moving the hooks 18 horizontally since the largest area of opening into the bight 84 is in the vertical plane adjacent the free ends 86. Horizontal movement of the hooks 18 is simply accomplished by reciprocating the trolley 30.

When support bars 16 are located in the bights 84 of the hooks and the spreader bar 20 raised by lengthening the cable loop, the weights 14 are suspended on the hooks 18. The weights 14 are of such a greater manitude than the counterweight 80 that they overcome the counterweight forces and cause the spreader bar 20 to pivot so that the hooks 18 are oriented generally vertically as shown in FIG. 5 (in full lines). When so oriented, the free ends 86 of the hooks 18 point upwardly so that the support bars 16 rest in the cradle of the bights 84, ensuring that the support bars do not slip off the hooks 18.

A typical operating cycle for unloading four weights 14 starts by locating the spreader bar 20 at an appropriate height so that the horizontally extending free ends 86 of the hooks 18 are at a lower level than the support bars 16 of the weights. The trolley 30 is reciprocated, moving the spreader bar 20 and the hooks 18 horizontally, so that the free ends 86 of the hooks 18 pass underneath the support bars 16 and the support bars 16 are thus in the bights 84 of the hooks 18. Generally, it is preferable to move the trolley 30 far enough so that the support bars 16 are well into the bights 84 as shown in FIG. 4. This ensures that the support bars 16 ae located securely in the bights 84 of the hooks 18.

The cable loop is then expanded to raise the weights 14 so that they are suspended from the spreader bar 20, the weights 14 overcoming the counterweight 80 as outlined above so that they hang securely from the vertically oriented hooks 18. With the weights 14 so suspended, the trolley 30 is moved along the rails 12 to the rear of the truck 10 so that the weights 14 are suspended over the platform of the scale beyond the truck bed. The cable loop is then shortened, lowering the weights 14 until they rest on the scale platform.

When the weights 14 come to rest on any supporting surface and the hooks 18 are lowered slightly beneath that point, the counterweight 80 causes the hooks 18 to pivot as already detailed. The trolley 30 then may be further moved rearwardly, freely carrying the hooks 18 with it. Neither the tops nor bottoms of the support bars 16 will interfere with the hooks because of the horizontal orientation of the free ends 86 and the diverging orientation of the midsections 88.

When the hooks 18 reach the point where they may be raised vertically with the free ends 84 of the hooks 18 clearing the support bars 16, the cable loop is expanded to raise the spreader bar 20 and hooks 18. When the hooks 18 are at an appropriate height, the trolley 30 is moved along the rails 12 back into the truck 10 to pick up another set of weights 14.

I claim:

1. A device for safely supporting a weight block having a pick-up bar on the end of a cable, which device automatically disengages from the block when deposited upon a support at a desired location, comprising:
    a support cable;
    means for reciprocating said cable both horizontally and vertically;
    a spreader bar pivotally suspended from said cable and having a hook rigidly secured to said bar and outstanding therefrom with an open ended bight which may engage and lift upon a pick-up bar in the weight block, the free end of said hook being shaped to point upwardly from horizontal when so engaged and lifting; and
    a counterweight on said spreader bar which pivots said spreader bar and said hook together so that the free end of said hook points horizontally or downwardly when the weight is deposited and the hook disengaged from said pick-up bar.

2. The device of claim 1, wherein said means for reciprocating said cable both horizontally and vertically comprises:
    an enclosed truck bed;
    a pair of rails mounted to suspend horizontally from the ceiling of said enclosed bed and extending fore and aft;
    a trolley mounted for powered movement along said rails;
    a weight lifting cable forming a loop by passing over a pulley at each end of said rails and having one end of said cable secured on said trolley and a free end passing over a sheave in said trolley; and
    means for reciprocating one of said pulleys fore and aft.

3. A mobile scale testing mechanism for transporting certified weight blocks to a vehicle weighing scale, depositing said blocks upon the platform of such a scale to be tested and for retrieving such blocks after such test, each block having a central pick-up bar, comprising:
- a mobile unit having a weight supporting transport floor and a weight lifting unit thereabove, said lifting unit including a trolley movable longitudinally above, over and beyond said transport floor, and lift members carried by the trolley;
- a weight lifting spreader bar attached to the lift members, said bar carrying a plurality of hooks rigidly secured to the bar, each hook being shaped to extend under one pick-up bar on one of said weight blocks, each hook having an open bight and a free end adjacent the bight extendable under the pick-up bar on the weight block;
- a counterweight attached to said spreader bar to rotate same about said lift members to arrange said hook free ends into generally horizontal orientation whereby said weight blocks may be engaged and disengaged from the hooks during horizontal motion of the trolley without other manipulation.

4. A device for safely supporting weight block pick-up bars on the end of a cable, which device automatically disengages from the blocks when they are deposited at a desired location, comprising:
- a spreader bar having at least two hooks projecting therefrom in an immovable position relative to the bar so as to move with the bar as the bar moves, each hook being spaced from the other hook for attaching the pick-up bar of a weight block; and
- a counterweight on said bar which, when carried weight blocks are resting so that no weight is supported by said hooks, causes said spreader bar to pivot so that the tips of the hooks clear said weight block pick-up bars when said spreader bar is moved horizontally.

5. A mobile scale testing mechanism for transporting certified weight blocks to a vehicle weighing scale, depositing said blocks upon the platform of such scale to be tested and for retrieving such blocks after such test, comprising:
- a truck body floor and horizontal fore and aft oriented conveyor adapted for mounting upon a mover for transport over a public highway, said body floor having space beneath said conveyor for receiving and carrying weight blocks at the order of 1000 pounds each with each block having a central pick-up bail, said conveyor having a horizontal rail and a trolley mounted for powered movement therealong;
- a weight lifting cable looped over pulleys near each end of the rail with one cable end secured to the trolley and the other cable end passing over a trolley carried sheave downwardly to a free end equipped to pick up such weight blocks;
- power means for lengthening and shortening said cable loop to raise and lower said free end in weight raising and lowering movement;
- a weight lifting spreader bar secured to the free end of the cable with multiple hooks thereon to engage and lift the weight blocks, said bar and hooks being movable rotatively together relative to said cable; and
- means biasing said hooks open selectively to catch and release said block bails during horizontal movement of the trolley and automatically lifting upon lengthening of the cable loop thus speeding transfer of the weight blocks between truck body floor and weighing platform.

6. A mobile scale testing mechanism for transporting on a mobile unit floor certified weight blocks to a vehicle weighing scale, depositing said blocks upon the platform of such a scale to be tested and for retrieving such blocks after such test, each block having a central pick-up bar, comprising:
- a set of rails horizontally mounted above the mobile unit floor supporting the weight blocks wherein said rails extend beyond the floor from the rear of the mobile unit;
- a trolley guided by said rails and carrying a lift cable sheave;
- means for reciprocating said trolley on said rails;
- a looped cable reaved about spaced apart pulleys generally located near the respective ends of said rails, one end of said cable being attached to said trolley and the other end passing around the lift cable sheave on said trolley so that said other end hangs freely downward;
- means for selectively adjusting the length of said loop to raise and lower the end of said cable hanging freely downward from the trolley; and
- means for carrying multiple weight blocks on the free end of said cable.

7. The mobile scale testing mechanism of claim 6, wherein said means for carrying multiple weight blocks comprises:
- a spreader bar having at least two hooks movable with and projecting therefrom, each for attaching the pick-up bar of a weight block; and
- a counterweight on said bar which, when carried weight blocks are resting so that no weight is supported by said hooks, causes said spreader bar to pivot so that the tips of the hooks clear said weight block pick-up bars when said spreader bar is moved horizontally.

8. The mobile scale testing mechanism of claim 6, wherein:
- said means for adjusting the length of said loop comprises a hydraulic cylinder for reciprocating one of said pulleys.

* * * * *